Jan. 4, 1955     T. B. TAYLOR     2,698,925
ADAPTER FOR BUS DUCT PLUG-IN DEVICES
Filed May 8, 1952     3 Sheets-Sheet 1
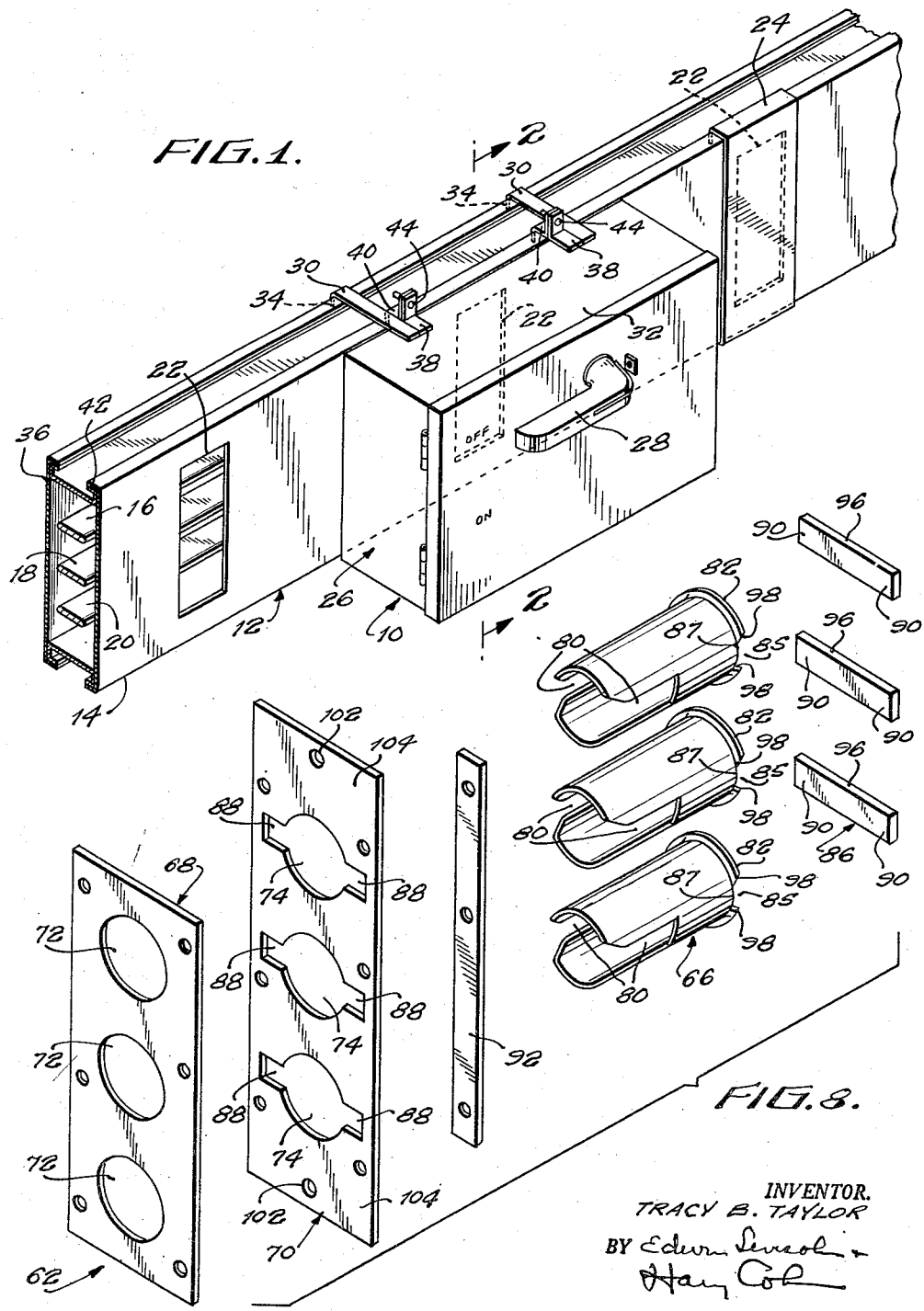
INVENTOR.
TRACY B. TAYLOR Jan. 4, 1955

T. B. TAYLOR 2,698,925

ADAPTER FOR BUS DUCT PLUG-IN DEVICES

Filed May 8, 1952

INVENTOR.
TRACY B. TAYLOR
BY Edwin Lirsch +
Harry Cole
ATTORNEYS

Jan. 4, 1955  T. B. TAYLOR  2,698,925
ADAPTER FOR BUS DUCT PLUG-IN DEVICES
Filed May 8, 1952  3 Sheets-Sheet 3
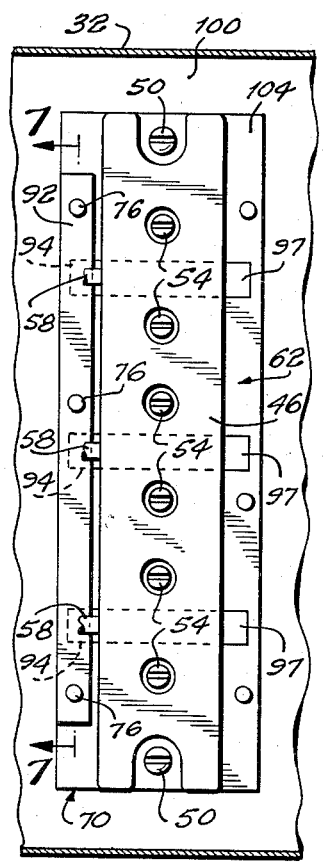
FIG.1.
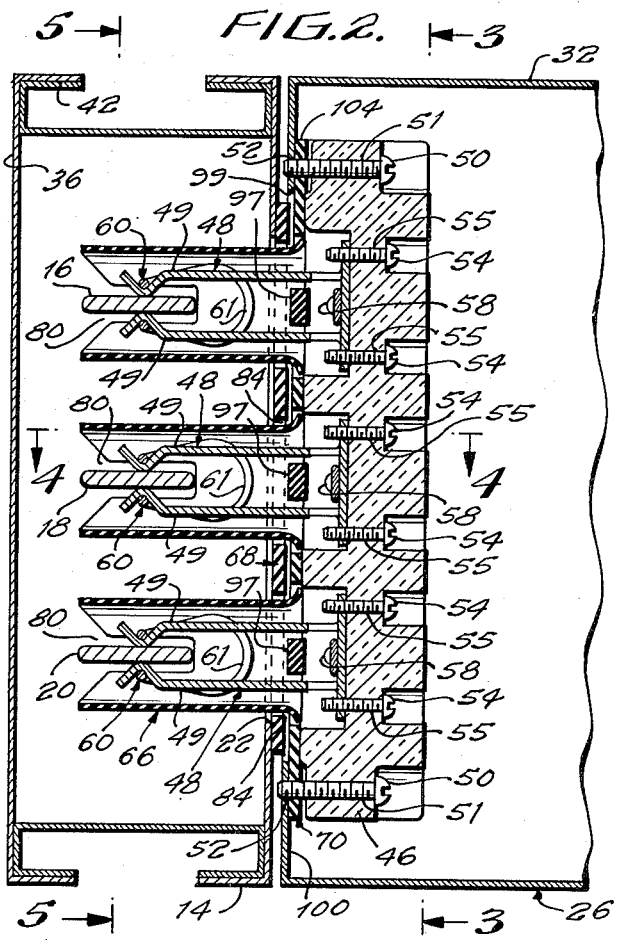
FIG.2.
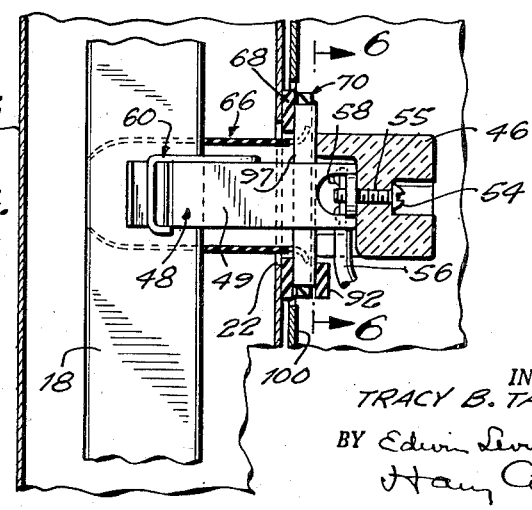
FIG.3.
FIG.4.
INVENTOR.
TRACY B. TAYLOR
BY Edwin Levsohn +
Harry Cole
ATTORNEYS

United States Patent Office 2,698,925
Patented Jan. 4, 1955

2,698,925

ADAPTER FOR BUS DUCT PLUG-IN DEVICES

Tracy B. Taylor, South Orange, N. J., assignor to Federal Electric Products Company, Essex County, N. J., a corporation of Delaware Application May 8, 1952, Serial No. 286,731

12 Claims. (Cl. 339—22)

This invention relates to plug-in devices for bus ducts in general and, more particularly, to an adapter for bus duct plug-in devices.

One object of the present invention is the provision of an improved adapter which may be readily attached to a plug-in device for electrically insulating the plug-in device terminals from improper contact with the bus bars.

Another object of the present invention is the provision of an adapter of the above character which is of simple construction, economical to manufacture and highly efficient in operation.

Yet another object of the present invention is the provision of an adapter of the above character having improved means for the ready removal and replacement of the individual insulation sleeves and for the proper positioning of said sleeves.

The above and other objects, features and advantages of the present invention will be more fully understood from the following description considered in connection with the accompanying illustrative drawings.

In the drawings:

Fig. 1 is a perspective view showing a plug-in device, according to the present invention, attached to a bus duct;

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 2;

Fig. 8 is a perspective view of the adapter, according to the present invention, shown in disassembled relation.

Figure 5:
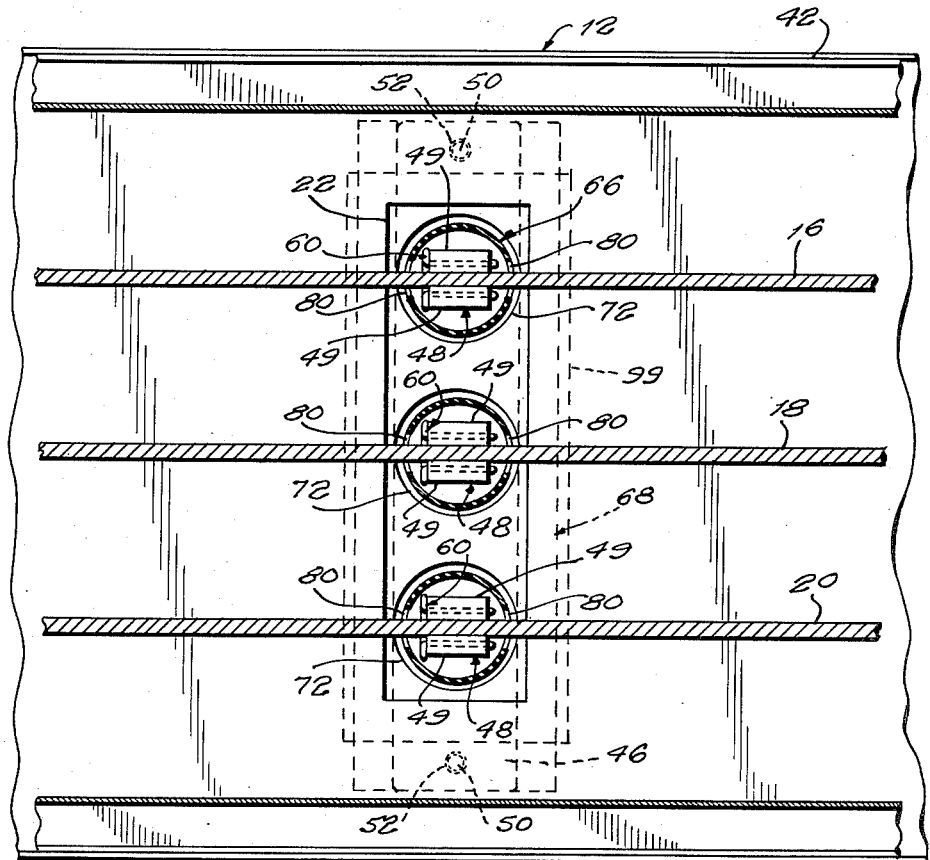
Fig. 5 is a sectional view taken on the line 5—5 of Fig. 2.

Referring to the drawings and, more particularly, to Fig. 1 thereof, there is shown a plug-in device 10, according to the present invention, both mechanically and electrically attached to the bus duct 12. The bus duct 12 may be of any of the well known types and comprises a longitudinally extending conduit 14 having electrical bus bars 16, 18 and 20 longitudinally extending therein in laterally spaced relation. The bus duct 12 is provided with longitudinally spaced openings 22 through which contacts of branch supply outlet devices, for example plug-in device 10, can be inserted for electrical connection with the bus bars 16, 18 and 20. Each of the openings 22 may be provided with a cover 24 which is adapted to be removed for connecting the plug-in device 10 to the bus duct 12. The plug-in device 10 may be any suitable branch supply outlet device which is adapted to be electrically connected to the bus duct for supplying a branch circuit. The plug-in device 10, for example, may be a suitable switch for controlling a branch supply and comprises a housing 26 having an externally mounted handle 28 adapted to operate the switching mechanism disposed within the housing.

The housing 26 is mechanically connected to the bus duct 12 by means of the spaced straps 30 which are secured to the top wall 32 of the housing 26 in any conventional manner. The straps 30 are provided with depending flanges 34 at one end which are adapted to engage adjacent portions of the face 36 of duct 12, it being noted that suitable straps are also provided for the bottom wall of the housing 26. Secured to the top wall 32 of the housing 26 in laterally spaced relation are clamping members 38 which are adapted to cooperate with the retainers 40 for securing the housing 26 firmly in position. The retainers 40 are adapted to interengage with the longitudinally extending flange 42 of duct 12 and are adjustably secured in position by means of the screws 44 which serve to secure the clamping members 38 to the retainers 40. The manner of electrically connecting the plug-in device 10 to the bus duct 12 will be described in detail hereinafter.

The plug-in device 10 is provided with an insulation block 46 (see Figs. 2, 3 and 4) of conventional construction, said insulation block carrying the resilient clips or terminals 48 which are adapted to engage the bus bars 16, 18 and 20 when the device 10 is plugged into the duct 12. The porcelain or other insulation block 46 is contained within the housing 26 and is secured in position by means of the screws 50 which extend through the apertures 51 and are received in the tapped holes 52 of the back wall 100 of the housing 26. The resilient clips 48 are of conventional construction, comprising a pair of laterally spaced arms 49, and are secured to the insulation block 46 in any conventional manner, as by means of screws 54 which are received in the aperture 55 of said block. Each of the resilient clips 48 has secured thereto a conductor 56, said securement being effected in any conventional manner, as by means of the rivets 58. It will be understood that each of the conductors 56 is mechanically secured to a clip 48 in electrical conducting relation therewith and the conductors 56 are connected to associated terminals in the housing 26 in any conventional manner. Each of the resilient clips 48 may be provided with reinforcing springs 60 which are adapted to urge the arms 49 of the clips 48 against the bus bars 16, 18 and 20 when the device 10 is connected to the duct 12. It will be understood that the clips 48 and springs 60 are of conventional construction and that the arms 49 of the clips 48 are adapted to be spread apart for engagement with the bus bars.

Figure 7:
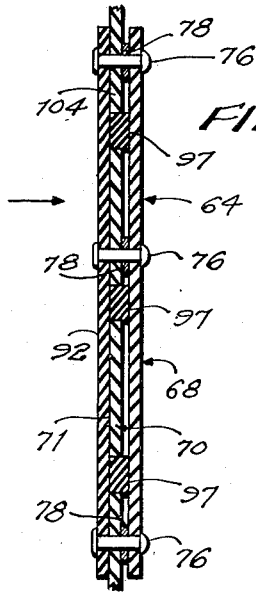
Fig. 7 is a sectional view taken on the line 7—7 of Fig. 3.
Figure 6:
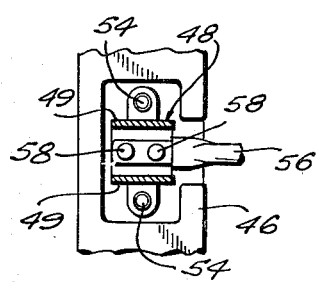
Fig. 6 is a sectional view taken on the line 6—6 of Fig. 4.

In order to electrically insulate the resilient clips 48 of the plug-in device 10 from improper contact with the bus bars disposed within the conduit 14, there is provided an adapter 62 which is adapted to be secured in housing 26 relative to the insulation block 46. The adapter 62, which may be constructed of any suitable insulating material, comprises a supporting base 64 and a plurality of spaced insulating sleeves 66 which are removably attached to the base 64. The base 64 comprises two insulating strips 68 and 70 having openings 72 and 74, respectively, in registry with each other in the assembled condition of the adapter. The insulation strips 68 and 70 are secured together in any conventional manner, as by means of the rivets 76 which extend through suitable apertures in said strips, the latter being preferably spaced from each other by the interposition of spacers 78 through which the rivets 76 extend. The openings 72 and 74, which are in registry with each other in the assembled condition of the adapter, are adapted for the reception of the tubes 66 and clips 48, said openings being spaced corresponding to the spacing of the clips 48. The openings 74 of strip 70 are somewhat larger than the openings 72 of strip 68 for a purpose which will be evident from the description which follows. The insulation tubes or sleeves 66 are each structurally identical and are slotted at 80 to accommodate their associated bus bars, said sleeves being each provided with a peripherally extending flange 82 at one end which is adapted to cooperate with the peripherally extending marginal edge 84 of strip 68 for the positioning of the sleeve 66 relative to the base 64. The peripherally extending flanges 82 are cut away at diametrically opposite portions, as indicated at 85, said cut away portions being adapted for the reception of the retainer strips 86. The strip 70 is further provided with diametrically opposed cut away portions 88 which are in communication with the openings 74, said cut away portions being adapted to receive end portions 90 of the retainer strips 86. There is further provided a longitudinally extending strip 92 which is adapted to be secured to the base 64 by the rivets 76 which secure the strips 68 and 70 in assembled condition. The longitudinally extending strip 92 is secured in overlapping relation with the insulation strips 68 and 70 and intermediate portions of the strip 92 are adapted to overlie the series of cut away portions 88 at one side of the strip 70. Thus the longitudinally extending strip 92 when assembled to the strips 68 and 70 in the above manner define a plurality of longitudinally aligned recesses 94 which are adapted for the reception of one end portion 90 of the retainer strips 86 for the securement of the insulation sleeves 66 in position. The sleeves 66 are adapted to be individually readily removed and replaced and are assembled to the base 64 of the adapter by being inserted through the registered openings 72 and 74 from the underside of the base 64 in the direction of the arrow shown in Fig. 7 until the peripherally extending flange 82 abuts the marginal edge 84 of strip 68. The sleeves 66 will be positioned relative to the base 64 in such a manner that the cut away portions 85 of the flange 82 are in substantial alignment with the cut away portions 88 of the strip 70. With the sleeve 66 so positioned the retainer strips or members 86 are secured in position, one end portion 90 of the retainer strip being received in the recess 94 and the opposite end 90 thereof being received in a diametrically opposite cut away portion 88. With the retainer strips 86 being so positioned they will be substantially flush with the underside 71 of strip 70. Each of the sleeves 66 may be individually removed and replaced by lifting one end 90 of the retainer strip 86 outwardly of the cut away portion 88 and removing said strip from the recess 94. It will be understood that with the sleeves 66 secured in position by the retainer strips 86, they will be restrained against rotation about their longitudinal axis by the cooperative relation between edge portions 96 of strips 86 and the edges 98 of flanges 82 which are defined by the cut away portions 85. Similarly, with the sleeves 66 secured in position by the retainer strips 86, they will be restrained against axial movement by the cooperative relation between face portions 97 of strips 86 and the edges 87 defined by the cut away portions 85 of said sleeves. The sleeves 66, when secured to the base 64 in the above manner, will have a small amount of lateral and rotational movement whereby they may readily align themselves with the bus bars 16, 18 and 20 when the device 10 is plugged into the duct 12, as shown in Fig. 2. The openings 74 of strip 70 are larger than the openings 72 of strip 68 whereby the peripherally extending flanges 82 of sleeves 66 may clear the openings 74 when the sleeves 66 are assembled to the base 64. It will be noted that the longitudinally extending strip 92 is substantially of the same length as strip 68 and that the latter strip is somewhat shorter than strip 70. The strip 68 is dimensioned substantially complementary to the opening 99 defined in the back wall 100 of the housing 26, said strip being adapted to be received in said opening 99 when the adapter is secured in position in the housing 26. Thus the strips or insulation plates 68 and 70, when secured together in the above described manner, form a rigid mounting member for the insulation sleeves 66, the latter being adapted to electrically insulate the clips 48 when the latter are in electrical connection with the bus bars 16, 18 and 20. The adapter 62 is adapted to be secured to the insulation block 46 in any conventional manner, as by means of the screws 50 which, as aforedescribed, are used to secure the insulation block to the back wall 100 of the housing 26. Thus the strip or plate 70 has its end portions apertured at 102, said apertures being adapted for the reception of screws 50 when the latter are received in the tapped holes 52. Thus, as best shown in Fig. 2, the adapter 62 is secured to the insulation block 46 with the strip or plate 70 being positioned between said insulation block and the back wall 100 of the housing. From the above, it will be seen that the end portions 104 of the strip 70 will abut adjacent surfaces of the back wall 100 and the insulation block 46 whereby the adapter 62 will be firmly secured in position relative to housing 26 and insulation block 46. With the adapter 62 assembled to the plug-in device 10 in the above manner, the clips 48 will be positioned interiorly of the sleeves 66 and the latter will be effective to electrically insulate the clips 48 from each other and from improper contact with the bus bars 16, 18 and 20 when the plug-in device 10 is plugged into the opening 22. In the assembly of the adapter to the block 46 the retainer strips 86 will be secured in position after the sleeves 66 have partially received the clips 48 whereby said strips may clear the bottom 61 of springs 60, said strips being inserted between the spaced arms 49 of said clips after clearing said springs.

It will be understood that the plug-in device 10 is adapted to be electrically connected and disconnected from the bus bars 16, 18 and 20 and for connecting the device 10 to the bus bars the clips 48 and their associated sleeves 46 are aligned with the opening 22 and the device 10 is firmly pressed against the conduit 14 whereby a firm electrical engagement between the clips 48 and the bus bars 16, 18 and 20 is effected. Thus the insulation sleeves 66, which surround the clips 48, will effectively prevent the latter from improperly contacting the bus bars extending in the conduit 14. The retainer strips 86 and their complementary structure in the adapter 62 provide a very efficient means for the ready removal and replacement of the insulation sleeves 66 individually and for the proper positioning of said sleeves whereby to prevent the rotation thereof about its axis more than a predetermined amount. It will also be noted that when the adapter 62 is secured in the housing 26 in the above manner, the interior of said housing will be substantially sealed against dirt and other contaminants, said adapter thusly closing off the back wall 100 of the plug-in device 10. The plug-in device 10 and the adapter 62, when assembled in the above manner, provide for a maximum factor of safety in handling and against accidental short circuits or grounds. While the plug-in device 10 has been described as a switch, it will be understood that the adapter 62 may be utilized in conjunction with any type of plug-in device.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. An adapter for a bus duct plug-in device comprising a supporting base of insulation material, a plurality of spaced insulation sleeves having one end adapted to be removably secured to said base, said base having a plurality of apertures extending therethrough and said one end of said sleeves having a peripherally extending flange adapted to cooperate with a peripherally extending marginal edge portion defined by said apertures when said sleeves are secured to said base, and means for removably securing said sleeves to said base, said means comprising a retainer strip member for each of said sleeves removably associated with said base, the latter having pairs of cutaway portions formed complementary to end portions of said members whereby when the latter are associated with said cutaway portions said sleeves will be secured relative to said base and said members will extend across said apertures, and means associated with one of said cutaway portions of each of said pairs of cutaway portions for defining a recess thereat, the latter being adapted for the reception of one end portion of an associated strip member.

2. An adapter for a bus duct plug-in device comprising a supporting base of insulation material, a plurality of spaced insulation sleeves having one end adapted to be removably secured to said base, said base having a plurality of apertures extending therethrough and said one end of said sleeves having a peripherally extending flange adapted to cooperate with a peripherally extending marginal edge portion defined by said apertures when said sleeves are secured to said base, and means for removably securing said sleeves to said base, said means comprising a retainer strip member for each of said sleeves removably associated with said base, the latter having pairs of cutaway portions formed complementary to end portions of said members whereby when the latter are associated with said cutaway portions said sleeves will be secured relative to said base and said members will extend across said apertures, and means associated with one of said cutaway portions of each of said pairs of cutaway portions for defining a recess thereat, the latter being adapted for the reception of one end portion of an associated strip member, said peripherally extending flange of each of said sleeves having cutaway portions defining spaced edges which are adapted to cooperate with adjacent portions of an associated retainer strip member to prevent the rotation of said sleeves about their axes when said sleeves are secured to said base by said strip members.

3. An adapter for a bus duct plug-in device comprising a supporting base of insulation material, said base comprising a pair of plates having a plurality of apertures extending therethrough, the apertures of each plate being in registry and one of said plates having pairs of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing each of said sleeves to said base, said means comprising a retainer strip member for each of said sleeves having end portions which are adapted to be received in a pair of said cutaway portions whereby to secure said sleeves relative to said base, and means associated with one of said cutaway portions of each of said pairs of cutaway portions for retaining an associated end portion of an associated strip member in position.

4. An adapter for a bus duct plug-in device comprising a supporting base of insulation material, said base comprising a pair of plates having a plurality of apertures extending therethrough, the apertures of each plate being in registry, and one of said plates having pairs of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing each of said sleeves to said base, said means comprising a retainer strip member for each of said sleeves having end portions which are adapted to be received in an associated pair of said cutaway portions whereby to secure said sleeves relative to said base, each of said peripherally extending flanges having diametrically opposed cutaway portions defining spaced edges which are adapted to cooperate with adjacent portions of an associated retainer strip member to prevent the rotation of said sleeves about their axes when said sleeves are secured to said base by said strip members, and means associated with one of said cutaway portions of each of said pairs of cutaway portions for retaining an associated end portion of an associated strip member in position.

5. An adapter for a bus duct plug-in device comprising a supporting base of insulation material, said base comprising a pair of plates having a plurality of apertures extending therethrough, the apertures of each plate being in registry and one of said plates having pairs of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing said sleeves to said base, said means comprising a retainer strip member for each of said sleeves having end portions which are adapted to be received in an associated pair of said cutaway portions whereby to secure said sleeves relative to said base, the apertures of said one plate being slightly larger than the apertures of said other plate whereby to provide clearance for said peripherally extending flanges in the assembly of said sleeves to said base, and means associated with one of said cutaway portions of each of said pairs of cutaway portions for retaining an associated end portion of an associated strip member in position.

6. An adapter for a bus duct plug-in device comprising a supporting base of insulation material, said base comprising a pair of plates having a plurality of apertures extending therethrough, the apertures of each plate being in registry and one of said plates having pairs of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing each of said sleeves to said base, said means comprising a retainer strip member for each of said sleeves having end portions which are adapted to be received in an associated pair of said cutaway portions whereby to secure said sleeves relative to said base, said one plate having a longitudinally extending retainer strip secured thereto in superposed relation at one side thereof, said last mentioned strip overlying one cutaway portion of each aperture of said one plate whereby to define at said one cutaway portion a recess, the latter being adapted for the reception of one end portion of an associated strip member, the other end of the latter being received in the cutaway portion diametrically opposed to an associated recess in the assembled relation of said sleeves and base.

7. An adapter for a bus duct plug-in device comprising a supporting base of insulation material, said base comprising a pair of plates having a plurality of apertures extending therethrough, the apertures of each plate being in registry and one of said plates having pairs of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing each of said sleeves to said base, said means comprising a retainer strip member for each of said sleeves having end portions which are adapted to be received in an associated pair of said cutaway portions whereby to secure said sleeves relative to said base, said one plate having a longitudinally extending retainer strip secured thereto in superposed relation at one side thereof, said last mentioned strip overlying one cutaway portion of each aperture of said one plate whereby to define at said one cutaway portion a recess, the latter being adapted for the reception of one end portion of an associated strip member, the other end of the latter being received in the cutaway portion diametrically opposed to an associated recess in the assembled relation of said sleeve and base, said strip members being transversely disposed relative to said insulation sleeves and lying substantially in the plane of said base.

8. A bus duct plug-in device comprising a housing having an insulation block secured thereto, a plurality of terminal members secured to said block in spaced relation and projecting externally of said housing, and an adapter secured in fixed relation relative to said block and housing, said adapter comprising a supporting base of insulation material, a plurality of spaced insulation sleeves surrounding said terminal members and having one end adapted to be removably secured to said base, said base having a plurality of apertures extending therethrough and said one end of each of said sleeves having a peripherally extending flange adapted to cooperate with a peripherally extending marginal edge portion defined by said apertures when said sleeves are secured to said base, and means for removably securing each of said sleeves to said base, said means comprising a retainer strip member for each of said sleeves removably associated with said base, the latter having pairs of cutaway portions formed complementary to end portions of said members whereby when the latter are associated with said pairs of cutaway portions said sleeves will be secured relative to said base and said members will extend across said apertures, and means associated with one of said cutaway portions of each of said pairs of cutaway portions for retaining an associated end portion of an associated strip member in position.

9. A bus duct plug-in device comprising a housing having an insulation block secured thereto, a plurality of terminal members secured to said block in spaced relation and projecting externally of said housing, and an adapter secured in fixed relation relative to said block and housing, said adapter comprising a supporting base of insulation material, said base comprising a pair of plates having a plurality of apertures extending therethrough, the apertures of each plate being in registry and one of said plates having a pair of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing each of said sleeves to said base, said means comprising a retainer strip member for each of said sleeves having end portions which are adapted to be received in an associated pair of cutaway portions whereby to secure said sleeves relative to said base, said spaced insulation sleeves being adapted to surround said terminal members when said adapter is secured in fixed relation relative to said block and housing and said strip member being effective to prevent the rotation of said sleeves about their axes, and means associated with one of said cutaway portions of each of said pairs of cutaway portions for retaining an associated end portion of an associated strip member in position.

10. A bus duct plug-in device comprising a housing having an apertured wall, an insulation block secured to said housing and having a plurality of terminal members projecting therefrom in spaced relation, said terminal members projecting externally of said housing through said apertured wall, and an adapter secured in fixed relation relative to said block and housing, said adapter comprising a supporting base of insulation material positioned between said apertured wall and said insulation block, said base comprising a pair of plates having a plurality of apertures extending therethrough, the apertures of each plate being in registry and one of said plates having a pair of diametrically opposed cutaway portions in communication with each of said apertures of said one plate, a plurality of spaced insulation sleeves having at one end a peripherally extending flange adapted to cooperate with a peripherally extending marginal edge portion defined by said apertures of the other of said plates when said sleeves are secured to said base, and means for removably securing said sleeves to said base, said means comprising a retainer strip member for each of said sleeves having end portions which are adapted to be received in an associated pair of cutaway portions whereby to secure said sleeves relative to said base, said one plate having a longitudinally extending retainer strip secured thereto in superposed relation at one side thereof, said last mentioned strip overlying one cutaway portion of each aperture of said one plate whereby to define at said one cutaway portion a recess, the latter being adapted for the reception of one end portion of an associated strip member, the other end of the latter being received in the cutaway portion diametrically opposed to said recess in the assembled relation of said sleeves and base, said spaced insulation sleeves being adapted to surround said terminal members when said adapter is secured in fixed relation relative to said block and housing and said strip members being effective to prevent the rotation of said sleeves about their axes.

11. An adapter for a bus duct plug-in device comprising a supporting base member of insulating material and provided with a plurality of apertures, a plurality of insulating sleeves extending through said apertures and each having an end portion so proportioned that it will not pass through its associated aperture but will abut against said base member, said base member being provided at each aperture with a recess; and a retainer member for each associated sleeve and aperture extending transversely across its associated aperture and having one of its ends fitted into its associated recess for holding its associated sleeve in fixed relative position to said base.

12. A bus duct plug-in device comprising a housing having an insulation block secured thereto, a plurality of terminal members secured to said block in spaced relation and projecting externally of said housing, and an adapter secured to said block and housing, said adapter comprising a supporting base of insulating material and provided with a plurality of apertures and a recess associated with each aperture, a plurality of insulating sleeves extending through said apertures and each having an end portion so proportioned that it will not pass through said aperture but will abut against said base member, and means for removably holding said sleeves in fixed relative position to said base including a retainer member for each associated sleeve and aperture extending across its associated aperture and into its associated recess.

References Cited in the file of this patent

UNITED STATES PATENTS

| 2,192,587 | Harvey | Mar. 5, 1940 |
| 2,318,861 | Huguelet | May 11, 1943 |
| 2,593,479 | Nieter | Apr. 22, 1952 |